Patented May 30, 1939

2,160,537

UNITED STATES PATENT OFFICE 2,160,537

ALCOHOL SOLUBLE RESINS

William H. Carmody, Pittsburgh, Pa., assignor to The Neville Company, Pittsburgh, Pa., a corporation of Pennsylvania No Drawing. Application May 21, 1938, Serial No. 209,371

11 Claims. (Cl. 260—81)

This invention relates to the production of resins from polymerizable materials of the class typified by the polymerizable constituents of crude solvent naphtha, and more particularly to the production of resins modified during the course of their production to possess alcohol solubility.

As is well known and understood in the art, crude solvent naphtha contains substantial proportions of substances, such as indene and coumarone, which may be converted into polymers of resinous nature, as by means of various catalysts. It is well recognized that the coumarone and indene resins resultant from simple thermal or catalytic polymerization procedures are insoluble in alcohols, and various procedures have been described for the production of resins of this class modified to possess alcohol solubility. In general, these procedures reside in effecting involvement with a phenolic substance, such as phenol, the cresols, the naphthols, and the like, during the polymerization step.

Although various known polymerizing catalysts may be used in the phenolic involvement procedures, it has been found that the use of activated clay is particularly desirable instead of the acid or halide catalysts sometimes used for simple polymerization of the reactive constituents of crude solvent naphtha. The alcohol solubility of the modified resins will generally vary in accordance with the reactivity of the phenolic substances, but as a rule higher solubilities result where the polymerization and concurrent phenolic involvement are effected under the influence of activated clay. Also, the use of clay is desirable because simple filtration separates it from the resin solution, thus rendering unnecessary the tedious and relatively expensive steps of neutralization and washing which attend the use of acid media such as the metallic chloride and sulfuric acid catalysts. Such a procedure is disclosed and claimed in United States Patent No. 2,077,009, granted April 13, 1937, to The Neville Company, of Pittsburgh, Pennsylvania, on an application filed by Joseph Rivkin.

In the practice of such procedures it has been customary to heat the mixture of crude solvent naphtha, phenolic substance, and activated clay to initiate reaction. As an example of such a procedure, 1 part of cresylic acid is mixed with 4 parts of crude solvent naphtha, and activated clay to the amount of about 6 per cent by weight of the total liquid mixture is then added. The mixture is then cautiously warmed, while being agitated, and at about 85° C. water begins to be liberated while at the same time reaction begins. As water continues to be liberated the reaction becomes more vigorous and cooling is necessary to keep the mixture in the vicinity of 100° C. This temperature affords a satisfactory reaction rate, and if the temperature is much higher there may be side or decomposition reactions, and the desired alcohol solubility is not obtained. The treatment may be continued for about four hours, further extension of the time being ineffective to increase the yield of hard resin of alcohol soluble character. The clay is then separated by filtration, the inert solvent is distilled from the reaction product, producing a resinous residue which may be separated, as by steam distillation, into a hard resin fraction, and a heavy oil, likewise phenolically involved, composed, it is thought, largely of the dimers and trimers of the polymerizable constituents of the naphtha. With suitable proportions of reactants and adequate temperature control, the resultant resin is of improved alcohol solubility.

Further investigation has shown that the water which is evolved in such phenol-involvement reactions is not liberated in the reactions themselves but rather arises from the activated clay, which contains an amount of moisture that is held quite firmly by the clay. While this moisture is retained by the clay it apparently acts in some manner to blanket its catalytic influence, and it is only when the moisture is driven from the clay to free its active surface that the desired reactions are initiated and continued. In other words, the reaction begins with the removal of water, and is proportional to it in intensity. As the heating continues, with liberation of greater and greater proportions of water from the clay, the influence of the clay upon the reaction becomes such that control of the reaction, by absorption of heat, becomes necessary. In consequence of this factor temperatures of the order of 100° C. have been necessary to initiate the reactions, and control of reaction has been necessary. Also, it is reasonable to assume that at the active surface of the clay there is, in effect, some super-heating, wherefore the use of activated clay for these purposes not only accelerates the reaction, but also acts to cause decomposition of the reaction products.

It is among the objects of the present invention to provide improvements in reactions of the type described, and more particularly to provide for more ready and more delicate control of the reaction with improvement in yields of resin while at the same time producing modified, or alcohol soluble, resin.

In the following tests the solubility was determined by heating 5 grams of the resin with 20 grams of 99 per cent isopropanol to cause solution, followed by slow cooling until turbidity of the solution indicated precipitation of the resin from solution.

I have discovered, and it is upon this that the present invention is predicated, that in the production of resin by polymerization and phenolic involvement as described hereinabove, the reaction may be controlled with material benefits by removing water from the reaction mass, i. e., from the sphere of reaction, at a controlled rate during at least a portion of such treatment, and preferably during the whole of the treatment. In prior practice it has been customary either to effect the reaction in an open container at a temperature such that vaporization of the inert solvent did not occur although the water liberated from the clay might escape at an uncontrolled rate, or by refluxing, in which case the water liberated from the clay remained in the reacting body. In both instances careful and adequate temperature control was necessary to attain suitable results both of yield and also of desired improvement in alcohol solubility. In contrast, in the practice of this invention water is removed during at least a part of the reaction and at a controlled rate whereby instead of requiring careful control to avoid deleterious temperature rise, it is generally necessary to continue the application of heat, and in any case more delicate control is achieved.

In the practice of the invention the water may be removed at a desired rate in various ways. For instance, the reaction may be effected in a container maintained under vacuum, or a current of inert gas, such as air, may be passed through the body of liquid, water being carried off by both procedures. Or, if desired, such passage of a current of inert gas may be achieved through the effect of vacuum instead of applying positive pressure of the gas.

The invention is applicable particularly to the production of modified resin from the polymerizable constituents of crude solvent naphtha. Such naphthas may contain indene and coumarone as the chief polymerizable constituents, which sometimes constitute as much as 60 per cent by weight of the naphtha. Some crude solvent naphthas, on the other hand, contain dicyclopentadiene as the major polymerizable constituent, and these and other polymerizable materials may be treated in accordance with the invention and with the benefits exemplified in the tests described hereinafter involving the production of modified coumarone-indene resins. It will be understood that the invention is applicable to solutions of such materials other than in naphtha hydrocarbons, but because crude naphtha is a convenient source it is referred to in detailing the invention and for brevity of reference, but not by way of limitation, in the claims.

Likewise, although it is necessary in the treatment of most solvent naphthas available in this country to add the phenolic modifying substance, it will be understood that some hydrocarbon liquids containing polymerizable constituents also contain greater or lesser amounts of phenols or phenolic substances. Such crudes may be treated in accordance with the invention, either with or without the further addition of phenolic substances, depending upon the initial content thereof.

As exemplifying the benefits derivable from the invention, in one test 1200 cc. of crude solvent naphtha containing coumarone and indene as the principal polymerizable constituents were mixed with 300 cc. of cresylic acid and 90 grams of "Superfiltrol" activated clay. The mixture was placed in a container fitted with a reflux condenser and warmed to a maximum temperature of 110° C. during a period of five hours, this procedure being in accordance with one embodiment disclosed in the above-identified patent. At the end of that time a portion of the material was withdrawn, filtered, and the filtrate analyzed. It consisted of 15 per cent by weight of alcohol soluble resin, 20 per cent by weight of phenolic heavy oil, 8 per cent by weight of unreacted cresylic acid, 25 per cent by weight of unreacted indene, and the balance inert diluent. The hard fraction of the resin had a solubility, or precipitation value, of 10° C. Such a resin has substantial and desirable alcohol solubility, but it will be observed that the yield of phenolic heavy oil, which at present has no great market value, was 25 per cent greater than the yield of alcohol soluble resin, while substantial amounts of indene and cresylic acid remained unreacted.

Treatment of the reaction mixture was then continued in accordance with this invention by removing the reflux condenser and drawing a stream of air through the liquid body by application of a slight vacuum, the mixture being heated with avoidance of substantial vaporization of hydrocarbon liquid. This treatment was continued for about three hours. At the end of that time the content of alcohol soluble resin was 33 per cent by weight, of phenolic heavy oil 27 per cent by weight, of unreacted cresylic acid 5 per cent by weight, and of unreacted indene and coumarone 3 per cent by weight, the balance being inert diluent. The hard resin now showed a precipitation value in alcohol of 9° C. While the solubility of the resin had not been greatly altered, the yield of resin was more than doubled, while the yield of phenolic heavy oil had been increased only about one-third, and the amount of unreacted cresylic acid and polymerizable constituents had been greatly reduced, the reaction being about as complete as might reasonably be expected.

In the practice of the prior art, as exemplified by the first stage of the foregoing test, there is the necessity for providing means for carefully and adequately controlling the temperature to maintain the reaction within bounds, for if the reaction is permitted to proceed uncontrolled the resin will be of low and unsatisfactory alcohol solubility, and the yield may be adversely affected. In the practice of the present invention, as exemplified by the second stage of the foregoing test, the removal of free water controls the reaction, and if the water is removed at a sufficient rate the mixture must be heated to maintain reaction. Thus the operation is simpler and is susceptible of more ready control and more certain results, all with avoidance of the difficulties attendant upon prior art procedures, and with greater assurance of production of resin of desired properties.

In the foregoing test the second stage exemplifies the ability to apply the present invention during a period only of the reaction. It may be used, however, throughout the reaction. In another test the same raw materials were used in the same proportions, the container being under a vacuum of about 240 to 250 mm. of mercury, thus providing conditions such that the boiling point of water was reduced to about 70° to 72° C. The maximum temperature of 101° C. was reached within one minute after the mixture had been heated to 60° C. This temperature surge is about like that experienced in the prior art procedures. The reaction produced 42 grams of resin having a melting point of 110° C. and a solubility of 42° C. The color of the resin was approximately one-half, which is substantially paler than other alcohol soluble resins of this type previously known to me.

In a test made under similar conditions except with more rigid temperature control to prevent the rapid temperature surge, there were produced 27 grams of resin having a melting point of 105° to 110° C., an alcohol solubility of 42° C., and a color less than one-half.

These latter two experiments indicate the valuable results obtainable through the practice of the invention in producing modified resins of exceptionally low color and of high melting point, coupled with improved alcohol solubility as compared with unmodified resins of the same class. While the alcohol solubility is not that needed for some purposes, it is much better than that of unmodified resin and suffices for some uses of the resin. The two tests show further that liberation of moisture from the clay under vacuum, and consequently at lower temperatures than normal, permits the reaction to be initiated and maintained with greater ease of control than heretofore. Under these conditions the mixture is restricted in activity, and the reaction can actually be brought to a standstill if necessary. That is, by venting the vessel to the atmosphere, which effectively raises the boiling point of the water in the clay, the formation of activated clay is retarded, causing the reaction to slow down and stop.

In still another experiment the same materials were mixed in the same proportions and the mixture was heated to a temperature just short of that causing reaction, with little or no water evolved. Air was then blown through the liquid body to remove the moisture from above the body of reaction liquid, and the temperature was maintained at 99° to 100° C. After six hours the liquid material showed, after separation from the clay, 36 per cent by weight of alcohol soluble resin, 24 per cent by weight of phenolic heavy oil, 4 per cent by weight of unreacted cresylic acid, 4 per cent by weight of unreacted indene and coumarone, and 32 per cent by weight of inert diluent. The precipitation value of the hard resin was 9° C. In this test the blowing of air through the mixture in effect lowered the vapor pressure of water above the mixture so that it was equivalent to the tests in which vacuum was used to the same end.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. In a method of effecting polymerization of polymerizable materials of the type occurring in crude solvent naphtha, with concurrent involvement with a phenolic substance under the influence of activated clay, that step comprising removing water at a controlled rate from the mass during at least a period of such treatment.

2. In a method of effecting polymerization of polymerizable materials of the type occurring in crude solvent naphtha, with concurrent involvement with a phenolic substance under the influence of activated clay, that step comprising removing water at a controlled rate from the mass throughout such treatment.

3. In a method of effecting polymerization of constituents of crude solvent naphtha with concurrent involvement with a phenolic substance under the influence of activated clay, that step comprising establishing conditions in the reacting system causing removal of water at a desired rate from the sphere of reaction, and continuing such conditions during at least a period of such treatment.

4. In a method of effecting polymerization of constituents of crude solvent naphtha with concurrent involvement with a phenolic substance under the influence of activated clay, that step comprising establishing conditions in the reacting system causing removal of water at a controlled rate from the sphere of reaction, and continuing such conditions throughout such treatment.

5. In a method of effecting polymerization of constituents of crude solvent naphtha with concurrent involvement with a phenolic substance under the influence of activated clay, that step comprising establishing temperature and pressure conditions such that water is progressively liberated from said clay at a rate which controls the vigor of the reaction, and continuing such conditions during at least a period of such treatment.

6. In a method of effecting polymerization of constituents of crude solvent naphtha with concurrent involvement with a phenolic substance under the influence of activated clay, that step comprising establishing temperature and pressure conditions such that water is progressively liberated at a controlled rate from said clay, and continuing such conditions during at least a period of such treatment.

7. In a method of effecting polymerization of constituents of crude solvent naphtha with concurrent involvement with a phenolic substance under the influence of activated clay, the step comprising effecting said reactions under vacuum and thereby removing water from the reaction body during at least a period of such treatment.

8. In a method of effecting polymerization of constituents of crude solvent naphtha with concurrent involvement with a phenolic substance under the influence of activated clay, the step comprising effecting said reactions under vacuum and thereby removing water at a controlled rate from the mass during such treatment.

9. In a method of effecting polymerization of constituents of crude solvent naphtha with concurrent involvement with a phenolic substance under the influence of activated clay, the step comprising passing a stream of inert gas through the reaction body, and thereby removing water therefrom, during at least a period of such treatment.

10. In a method of effecting polymerization of constituents of crude solvent naphtha with concurrent involvement with a phenolic substance under the influence of activated clay, the step comprising passing a stream of inert gas through the reaction body, and thereby removing water therefrom, and regulating said gas stream to control the rate of water removal.

11. In a method of effecting polymerization of constituents of crude solvent naphtha with concurrent involvement with a phenolic substance under the influence of activated clay, that combination of steps comprising heating the reaction mixture to a temperature just short of that productive of reaction, passing a stream of inert gas through the mixture, and controlling the rate of reaction by regulation of the rate of water removal by said gas.

WILLIAM H. CARMODY.